United States Patent [19]
Uriu et al.

[11] Patent Number: 5,875,177
[45] Date of Patent: Feb. 23, 1999

[54] PATH TEST SYSTEM FOR ATM SWITCH

[75] Inventors: Shiro Uriu; Yoshihiro Uchida; Shuji Yoshimura, all of Kawasaki, Japan

[73] Assignee: Fujitsu Limited, Kawasaki, Japan

[21] Appl. No.: 957,387

[22] Filed: Oct. 23, 1997

Related U.S. Application Data

[63] Continuation of Ser. No. 782,345, Jan. 13, 1997, abandoned, which is a continuation of Ser. No. 491,616, Jun. 19, 1995, abandoned, which is a continuation of Ser. No. 303,877, Sep. 9, 1994, abandoned, which is a continuation of Ser. No. 944,073, Sep. 14, 1992, abandoned.

[30] Foreign Application Priority Data

Sep. 12, 1991 [JP] Japan ................................. 3-232826

[51] Int. Cl.$^6$ ....................................................... H04J 3/14
[52] U.S. Cl. ........................... 370/244; 370/248; 371/20.4
[58] Field of Search ..................... 370/241, 242, 370/244, 248, 250, 395; 340/825.1; 371/20.1, 20.4, 27.1, 67.1, 27.2, 27.7

[56] References Cited

U.S. PATENT DOCUMENTS

| | | | |
|---|---|---|---|
| 4,542,507 | 9/1985 | Read | 371/20.1 |
| 4,775,977 | 10/1988 | Dehara | 371/27 |
| 4,807,229 | 2/1989 | Tada | 371/27 |
| 4,862,460 | 8/1989 | Yamaguchi | 371/27 |
| 4,947,388 | 8/1990 | Kuwahara et al. | 370/60 |
| 5,042,038 | 8/1991 | Proctor et al. | 371/27 |
| 5,072,447 | 12/1991 | Perloff et al. | 371/27 |
| 5,257,311 | 10/1993 | Naito et al. | 370/13 |
| 5,280,469 | 1/1994 | Taniguchi et al. | 370/13 |
| 5,313,453 | 5/1994 | Uchida et al. | 370/15 |
| 5,369,634 | 11/1994 | Denissen | 370/17 |
| 5,602,826 | 2/1997 | Yoshimura et al. | 370/248 |

*Primary Examiner*—Chau Nguyen
*Attorney, Agent, or Firm*—Staas & Halsey

[57] ABSTRACT

A sending trunk on the input side of an ATM switch is equipped with a test cell generating section, and a receiving trunk on the output side of the ATM switch is equipped with a test cell detecting section. The test cell generating section includes a unit for setting a test cell identifier in the header of a test cell and a unit for generating pieces of data with regularity in the information field of the test cell. The test cell detecting section includes a unit for detecting the test cell identifier from the header of a cell received and a unit for detecting regularity from data in the information field of the cell received. When a test cell is transmitted, the test cell detecting section evaluates the result of a test on the basis of the result of detection of the test cell identifier from the header of the test cell and the result of detection of the regularity from data in the information field of the test cell.

10 Claims, 7 Drawing Sheets

|  | 1 | 2 | 3 | 4 |
|---|---|---|---|---|
| FLAG 1 | H | H | L | L |
| FLAG 2 | H | L | H | L |
| TST OK | 1 | 0 | 0 | 0 |
| TST NG | 0 | 1 | 0 | 0 |

PATH TEST SYSTEM FOR ATM SWITCH

This application is a continuation of application Ser. No. 08/782,345, filed Jan. 13, 1997, now abandoned, which is a continuation of application Ser. No. 08/491,616, filed Jun. 19, 1995, now abandoned, which is a continuation of application Ser. No. 08/303,877, filed Sep. 9, 1994, now abandoned, which is a continuation of application Ser. No. 07/944,073, filed Sep. 14, 1992, now abandoned.

BACKGROUND OF THE INVENTION

The present invention relates to a path test system for an ATM switch.

Of recent years ATM (Asynchronous Transfer Mode) has been studied actively as a technique for a switching unit for a broadband integrated services digital network (BISDN) that is the next generation of ISDN.

The switch facilities of an ATM switching unit are equipped with a hardware configuration for high-speed operation. Thus, it is difficult to monitor directly the internal operation of the ATM switch. For this reason, the development of a method of performing a test to determine if the switch functions properly has been expected.

Figure 1:
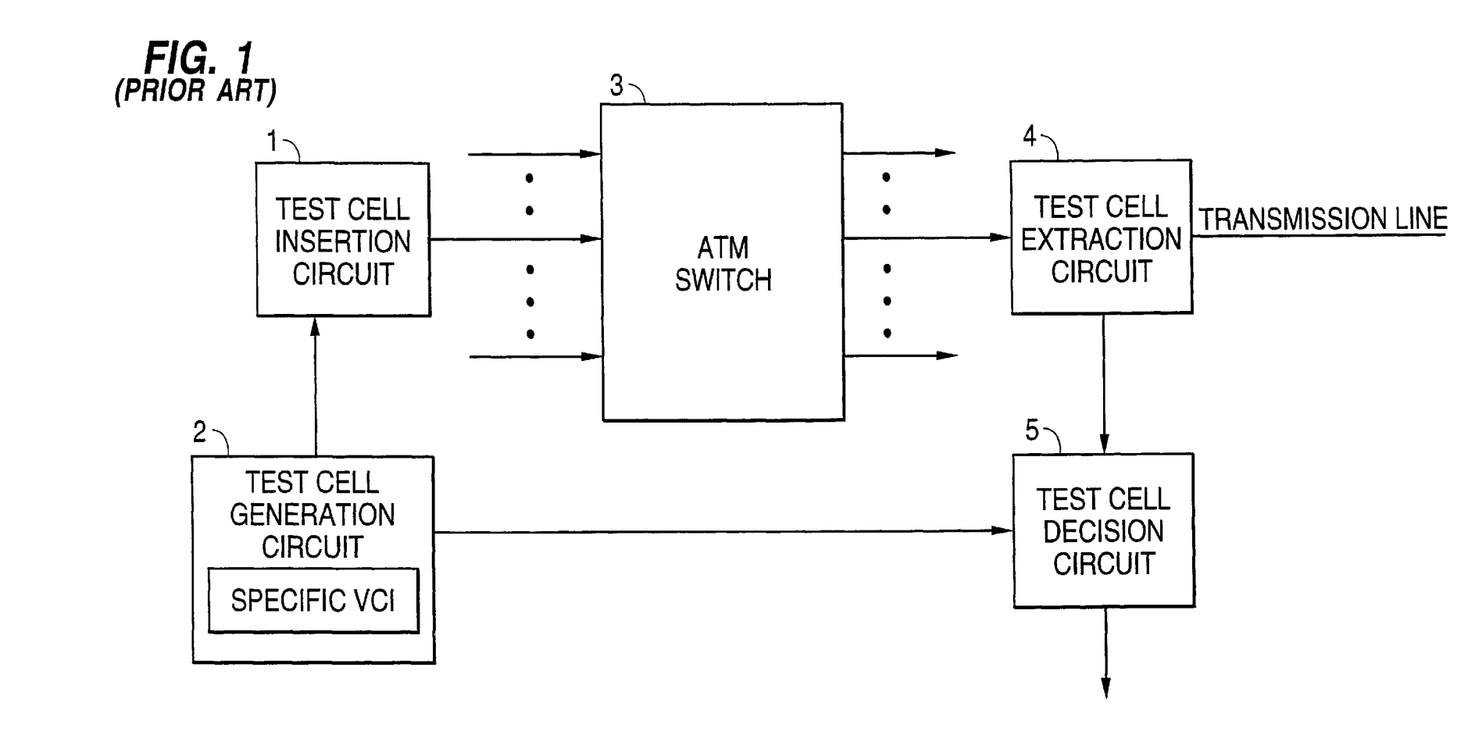
FIG. 1 illustrates a prior art configuration of an ATM switch testing system.

FIG. 1 illustrates a prior art. In this figure, 1 denotes a test cell inserting section, 2 denotes a test cell generating section, 3 denotes an ATM switch (ATMSW), 4 denotes a test cell extracting section, and 5 denotes a test cell decision section.

The ATM switch 3 in an ATM exchange has a function of switching a cell comprised of a 5-byte header and a 48-byte information field in accordance with header information (VPI/VCI: virtual path identifier /virtual channel identifier) and transferring it to an output (transmission line) determined by the header. In this case, knowing whether the ATM switch performs a switching operation properly in accordance with the header information is very important for maintaining the quality (performance) of the switching unit and moreover it is essential for maintenance thereof.

Here, a conventional method of checking the ATM switch will be described with reference to FIG. 1. The test cell generating section 2 is associated with the cell inserting section 1 provided on a cell transmission line input to the ATM switch. In testing the ATM switch the test cell generating section 2 generates a cell having a specific value (for example, all zeros) as its VCI and predetermined contents as the contents of its information field. This cell is inserted between usual cells for communication in the cell inserting section 1, and entered into the ATM switch 3 over the transmission line.

The ATM switch 3 establishes a path corresponding to the VCI having the specific value allocated to the test cell so as to transfer the test cell to a predetermined outgoing transmission line. If, therefore, the ATM switch 3 operates properly, the test cell will be output onto a predetermined transmission line. The test cell extracting section 4, provided on a transmission line onto which the test cell is output, extracts the test cell having the specific VCI value and outputs it to the test cell decision section 5.

The test cell decision section 5 checks the test cell extracted by the test cell extracting section 4 with the test cell generated by the test cell generating section 2. If the test cell extracted is identified as the test cell generated, then the decision section 5 outputs the test result representing the normality of the ATM switch 3.

A problem with the prior art system is that when, in the test cell decision section 5, by receiving data of a specific information field set in advance as a test cell from the test cell generating section 2 which does not agree with a cell extracted by the extracting section 4, it becomes impossible to detect whether or not the ATM switch 3 can switch all cells properly. That is, a test of the ATM switch (ATMSW) 3 has required an advance transmission of data in the information field of a test cell from the test cell generating section 2 on the input side of the switch to the test cell decision section 5 on the output side, which takes additional test time.

In addition, since the contents of the information field contained in a test cell are fixed, a problem arises in that variations in a bit pattern caused by a hardware fault occurring on a switch path cannot necessarily be detected. That is, if the contents of the information field in a test cell are fixed, it is impossible to detect the occurrence of a fault which causes a variation in a bit pattern corresponding to the information field pattern of the test cell. For example, when the content of the information field in the test cell is fixed to all zeros, the occurrence of a fault in which a line is stuck to "O" can not be detected.

SUMMARY OF THE INVENTION

An object of the present invention is to provide a path test system for an ATM switch, the path test system of ATM switch being capable of confirming a normality of the ATM switch and detecting a hardware fault occurring on the path.

A feature of the present invention is to provide a test cell generation section in a transmission trunk on the input side of the ATM switch. The test cell generation section comprises a test cell identifier generation unit for producing the test cell identifier as a header of the test cell and a first regularity data generation unit for sequentially generating the data varying with time in accordance with a determined regularity.

A test cell detecting section is provided on the reception trunk on the output side of the ATM switch and comprises a test cell identifier detecting unit, a regularity data detecting unit and a decision unit. The test cell identifier detecting unit detects a test cell identifier from a header of the received cell and the regularity data detecting unit determines whether the data of an information field of the received cell has a predetermined regularity. Further, the decision unit determines a normality of a switch and path of the ATM switch based on the detection results obtained from the test cell identifier detecting unit and the regularity data detecting unit.

The test cell generation section provided on the input side of the ATM switch transmits the data varying with time in accordance with the predetermined regularity in the information field of the test cell, and the test cell detection section on the output detects the test cell identifier of the test cell and detects whether the information field of the test cell has the predetermined regularity, thereby detecting whether the cell is properly switched and whether any hardware fault occurs and a switching path.

In this case, the test cell detection section 5 needs only to know data rules instead of having to carry all data in the information field of a test cell sent from the test cell generating section 2. Hence, the test cell generating section 2 no longer needs to send to the test cell detection section 5 data in the information field of a test cell, which simplifies a path test.

BRIEF DESCRIPTION OF THE DRAWINGS

One of skill in the art can easily understand additional features and objects of this invention from the description of the preferred embodiments and some of the attached drawings. In the drawings.

DESCRIPTION OF THE PREFERRED EMBODIMENTS

Figure 2:
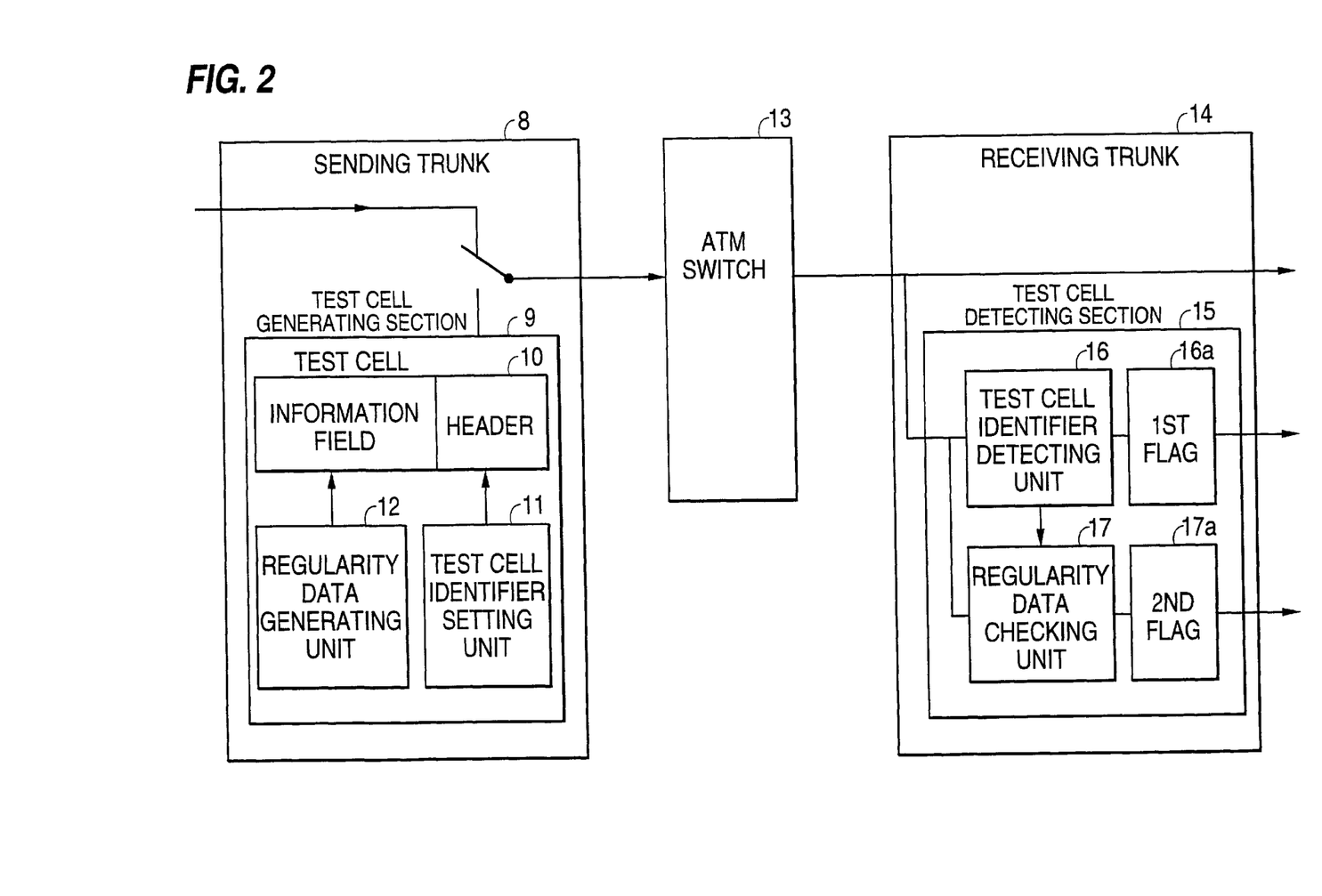
FIG. 2 illustrates fundamentals of the present invention.

FIG. 2 illustrates the fundamentals of the present invention.

In FIG. 2, 8 denotes a sending trunk, 9 denotes a test cell generating section, 10 denotes a test cell, 11 denotes a test cell identifier setting means, 12 denotes regularity data generating means, 13 denotes an ATM switch, 14 denotes a receiving trunk, 15 denotes a test cell detecting section, 16 denotes a test cell identifier detecting means, 16a denotes a first flag section which is set when a test cell is detected, 17 denotes a regularity data checking means, and 17a denotes a second flag section which is set when regularity is detected in the information field data by the regularity data checking means 17.

The present invention uses a test cell having a header in which a VCI indicating a test-cell is placed and an information field in which data varying with time in accordance with a predetermined regularity is placed, detects the proper switching of the test cell by means of a test cell identifier, and detects a hardware fault on a path by detecting the regularity of data in the information field.

The test cell generating section 9 is provided in the sending trunk 8. Into the header of the test cell 10 is placed a header obtained from the test cell identifier setting means 11 for generating a test cell identifier (for example, a specific VCI). Into the information field of the test cell is placed an output of the regularity data generating means 12 for generating regularity data (for example, counter values which change sequentially with each clock signal). When an output of the test cell generating section 9 is output to an incoming transmission line, the ATM switch 13 performs a switching operation as determined by the VCI in the header and inputs it to the receiving trunk 14 provided on a predetermined outgoing transmission line.

In the receiving trunk 14, the test cell identifier detecting means 16 in a test cell detecting section 15 examines an identifier in the header of an incoming cell and sets the first flag section 16a when it detects the test cell identifier. Upon detecting the identifier, the test cell identifier detecting means 16 causes the regularity data checking means 17 to check data in the information field of the incoming cell, which sets the second flag section 17a upon detecting the regularity in data.

The discrimination between indications of first and second flags generated by the test cell detecting section 15 in the receiving trunk 14 permits discrimination between the normality of switching and a hardware fault on a path, verifying that the switch is functioning properly or a fault is occurring in the switch.

Figure 3:
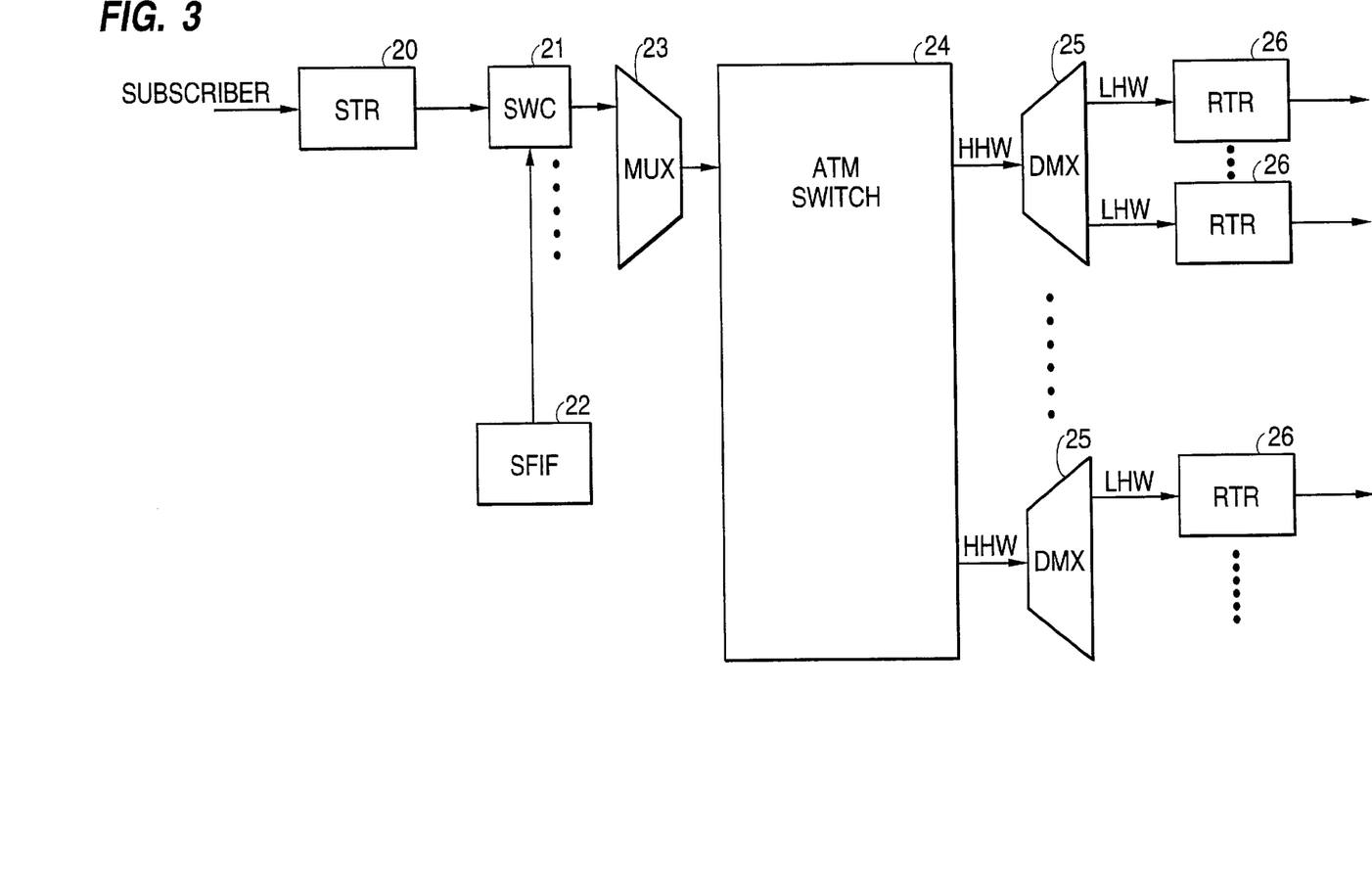
FIG. 3 illustrates a system configuration of an ATM switching unit embodying the present invention.
Figure 4:
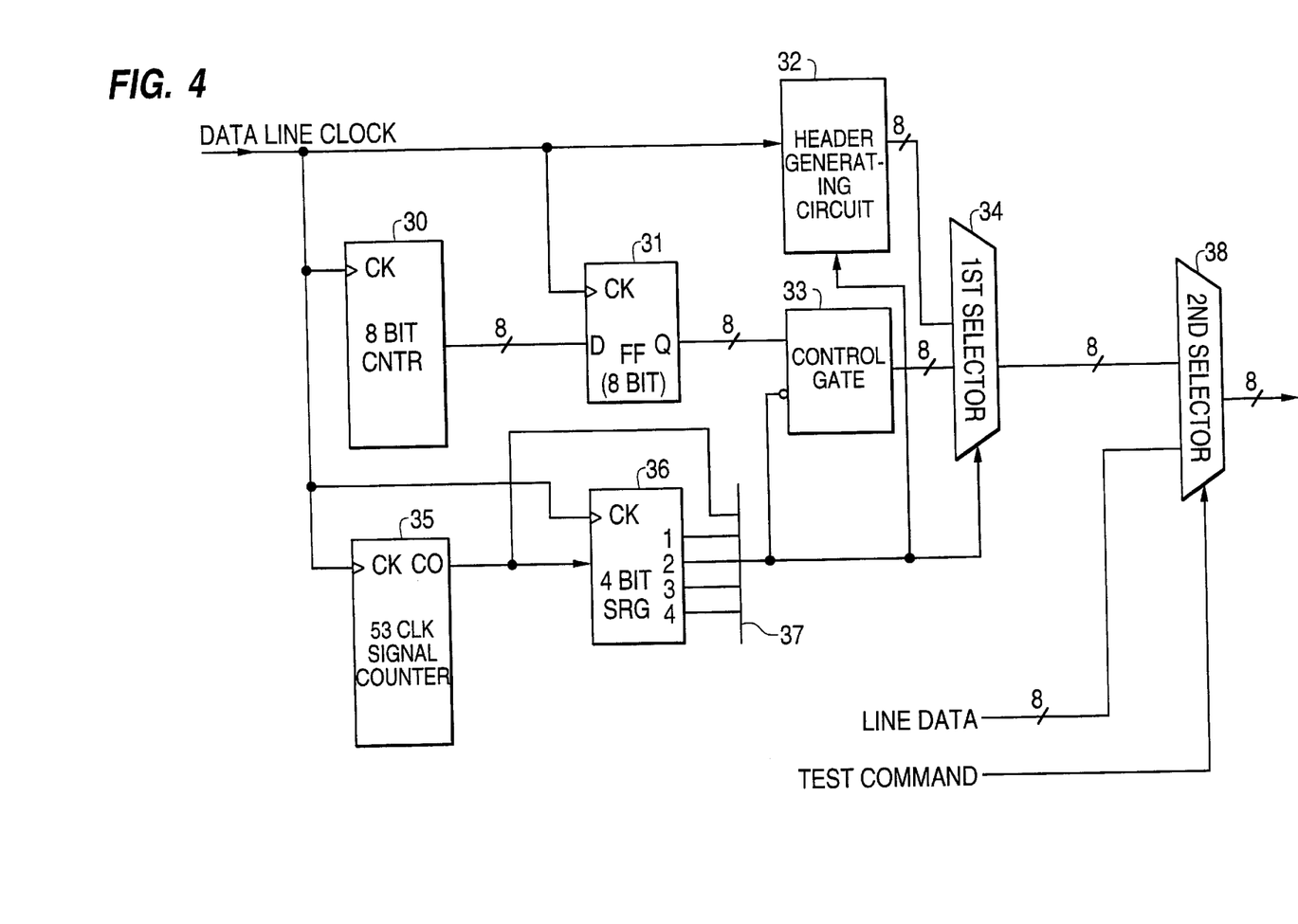
FIG. 4 illustrates an arrangement of the test cell generating section.
Figure 5:
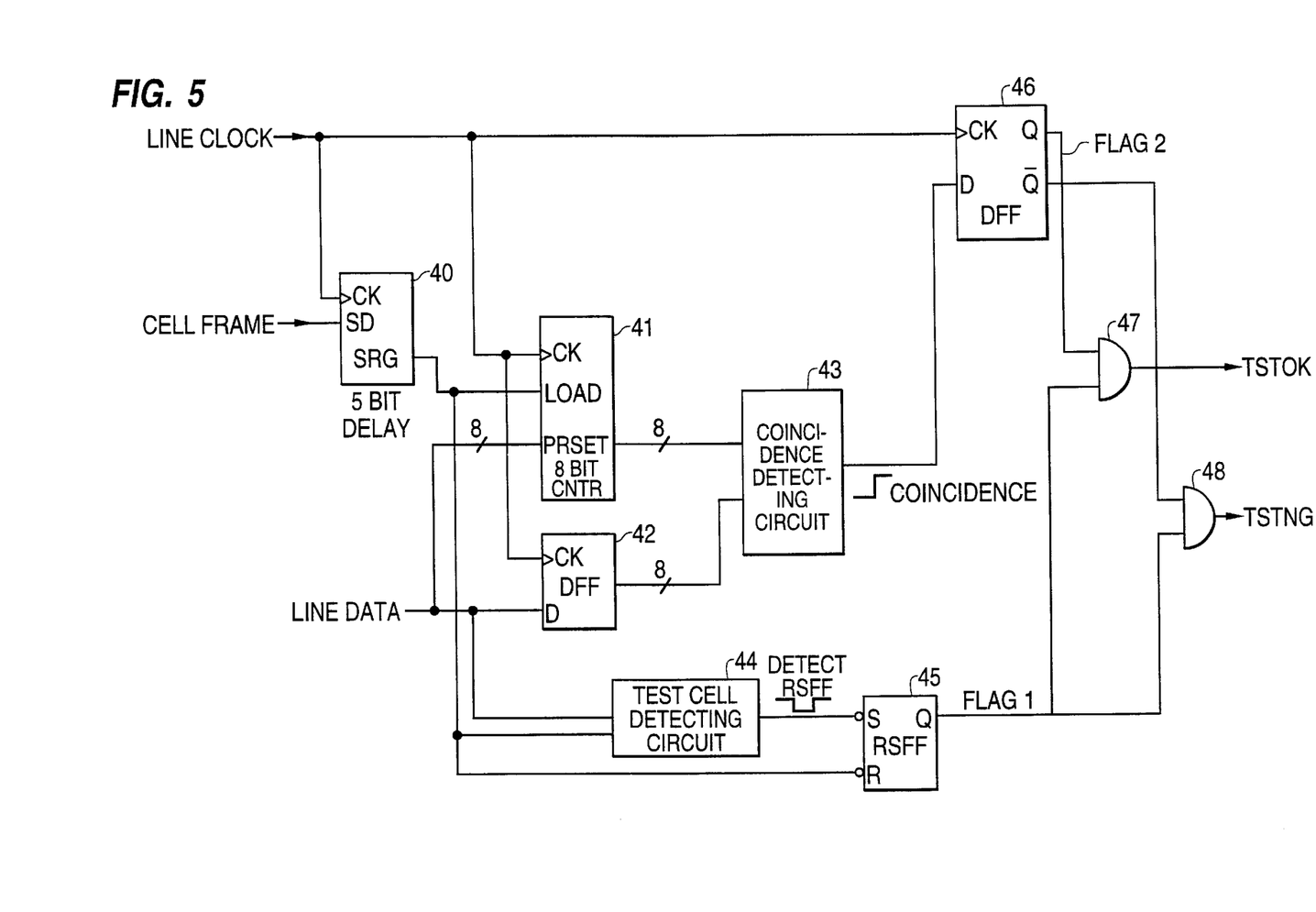
FIG. 5 illustrates an arrangement of the test cell decision section.
Figure 6:
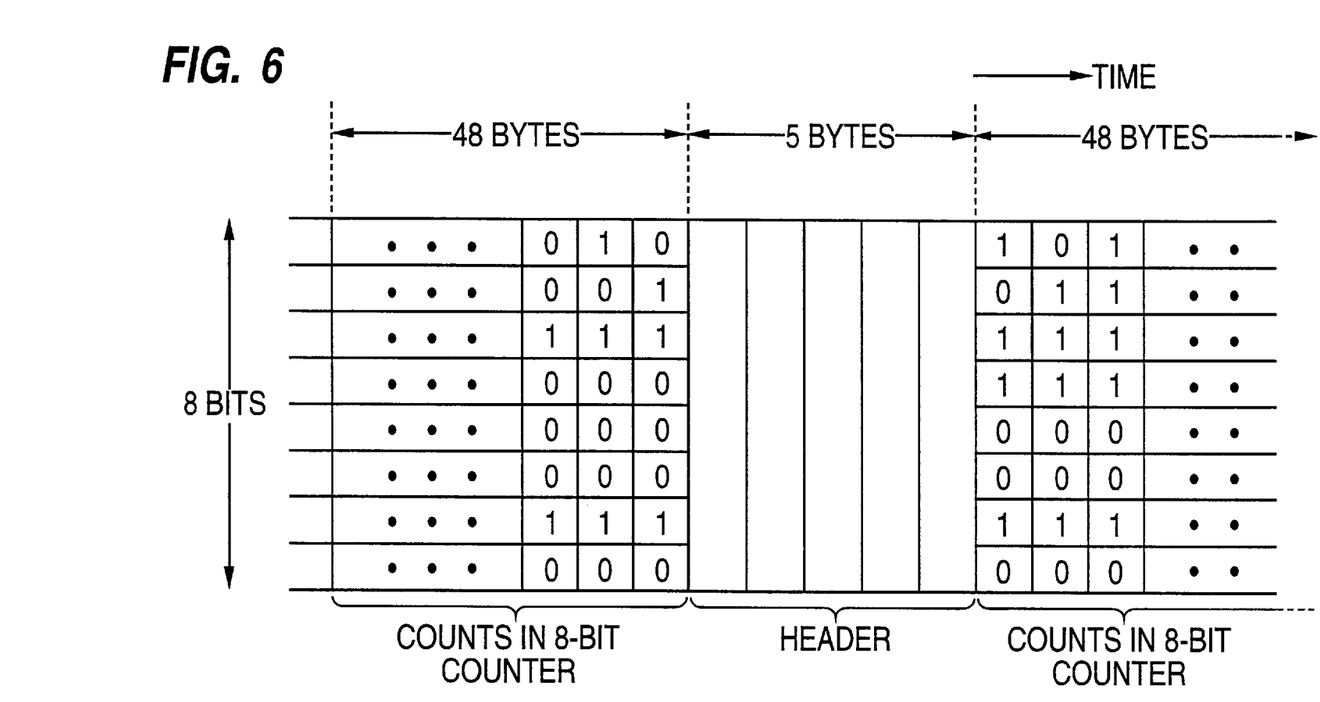
FIG. 6 is a diagram for use in explanation of the operation of the test cell generating section.

FIG. 3 shows a system configuration of an ATM switching unit to which the present invention is applied, FIG. 4 shows an arrangement of the test cell generating section, FIG. 5 shows an arrangement of the test cell detecting section, FIG. 6 is a diagram for use in explanation of the operation of the test cell generating section, and FIG. 7 is a diagram for use in explanation of the operation of the test cell detecting section.

In FIG. 3, 20 denotes the sending trunk (STR) having the test cell detecting means, 21 denotes a switch controller (SWC) which refers to a built-in VCI table and places path information (called a tag), indicating a path by which a cell passes through the switch, in that cell for subsequent application to the switch, 22 denotes a software interface (SFIF) for performing a process of setting path information corresponding to VCI from a control device in the VCI table, 23 denotes a multiplexing section (MUX) for multiplexing a plurality of cells, 24 denotes an ATM switch (ATMSW) for performing a path switching operation in accordance with a converted VCI, 25 denotes a demultiplexing section (DMX) connected to each high-speed highway (HHW) on the output side of the ATM switch 24 for demultiplexing multiplexed cells into low-speed highways (LHW), and 26 denotes a receiving trunk (RTR) connected to each of the low-speed highways and having a test cell detecting section.

In the configuration of FIG. 3, when the test cell generating section (its arrangement is shown in FIG. 4) in a sending trunk is instructed to generate a test cell, it generates a test cell in which a specific VCI (for example, all 0s) is placed in its header as an identifier and enters it into the switch controller 21. In the switch controller 21, path information on a desired outgoing transmission line for the test cell having the specific VCI has been previously set in the VCI table from the software interface 22.

The test cell from the switch controller 21 and cells from other sending trunks are multiplexed together in the multiplexing section 23 and then entered into the ATM switch 24. They are switched in the ATM switch 24 in accordance with their path information. Each high-speed highway (HHW), which is one of outgoing transmission lines, is demultiplexed by the demultiplexing section 25 into a plurality of low-speed highways (LHW) connected to a corresponding one of the receiving trunks 26. Of the receiving trunks 26, a receiving trunk that has been previously designated as a test cell inputting trunk performs test cell detecting operation in its test cell detecting section (corresponding to 15 in FIG. 2; its arrangement is shown in FIG. 5).

In FIG. 4 there is shown an arrangement of the test cell generating section. A test cell used in FIG. 4 contains specific VCI indicating a test-cell in its 5-byte header. It also contains 53 consecutive counts (a total of 53 bytes) of an 8-bit counter for providing a 1-byte output at each clock signal as regular data in its 53-byte information field.

That is, in FIG. 4, 30 denotes an 8-bit counter (8bit CNTR), 31 denotes 8-bit D-type flip-flops (FF) for holding parallel outputs of the 8-bit counter, 32 denotes a header generating circuit for generating a header containing a specific VCI as a test cell identifier, 33 denotes a control gate for controlling the passage of an 8-bit counter value held by the flip-flops, 34 denotes a first selector for selecting either of outputs of a gate 33 and the header 32, 35 denotes a 53-clock signal counter for counting to 53, 36 denotes a 4-bit shift register (4bitSRG), 37 denotes an OR circuit which takes the logical sum of the output of the 53 counter and four outputs of the 4-bit shift register 36, and 38 denotes a second selector which receives ordinary data (cells) input from a line circuit holding a subscriber's line or a transmission line and a test cell generated from a gate 2 and selects the test cell in response to application of a test command thereto.

In operation in FIG. 4, the test cell generating section receives data line clock signals (CK) to perform binary counting in the 8-bit counter 30. As shown in FIG. 6, the counter output changes regularly at each clock signal and its 8-bit content is stored in the flip-flop circuit 31 at each clock signal.

Namely, the 8-bit counter 30 counts up at every input from a line clock signal and the 8-bit data (as shown in FIG. 6) which is incremented by "1" is latched at 8-bit flip-flop circuit 31 at every input of the line clock signal.

The 53-clock signal counter 35 is a counter which counts clock signals CK up to 53. When 53 is reached by the count, the counter generates a carry-over (CO) output, so that it is reset to 0. The CO output is applied to the OR circuit 37 and the 4-bit shift register 36.

The shift register 36 comprises a cascade of four shift registers. In the shift register 36, the CO output at a high level from the counter 35 is shifted one flip-flop with each clock signal, so that its output terminals 1 to 4 go high in sequence. Thus, the OR circuit 37 produces an output at a high level during 5 clock signal periods from the time the counter 35 produced the CO output.

During a period when the output of the OR circuit 37 is high, the control gate 33 is disabled against entry of the output of the flip-flop 31 and the first selector 34 is switched to select the 5-bit parallel outputs of the header generating circuit 32. The header generating circuit 32 is enabled by the output of the OR circuit 37, so that the 5-byte contents of the header are read out in sequence in synchronism with line clock signals.

The above described operation of the test cell generation section is summarized as follows. Firstly, the output signal of the shift register 36 becomes high during the period of 5 clock signals after the 53 counter 35 outputs the carry over (CO) signal and simultaneously the output signal of the OR gate 37 becomes high. When the output signal of the OR gate 37 is high, the first selector 34 is switched to select the output from the header generation circuit 32 and then the output selector 34 sequentially outputs 5-bytes of the test cell identifier outputted from the header generation circuit 32 for the period of 5 clock signals.

On the other hand, until the 53 clock counter 35 counts 53 clock signals after it counts 5 clock signals, the output signal from the shift register 36 becomes low, thereby enabling the first selector 34 to be switched to select the output of the control gate 33. Therefore, the first selector 34 outputs the output signal from the flip-flop 31, namely, the count value of 8-bit counter 30 during the period of 48 clock signals.

Accordingly, the first selector 34 outputs 5-bytes of data of the test cell identifier output from the header generation section 32 as shown in FIG. 6 during the period of the first 5 clock signals when the 53 counter 35 counts 53 clock signals and outputs the 48-bytes data of the information field corresponding to the counts of the 8-bit counter 30 at every clock signal of the data line during the period of the remaining 48 clock signals. Therefore, the first selector 34 provides the test cell comprising 5-bytes of test cell identifier and 48-bytes of count values varying with time and with regularity to the second selector 38.

The second selector 38 in FIG. 4 selects the test cell which is the output of the first selector when a test command from a control device (not shown) goes high and data from the line section connected to the subscriber's line (or transmission line) when the command is low.

FIG. 5 shows an arrangement of the test cell detecting section 15.

In FIG. 5, 40 denotes a shift register (SRG), 41. denotes an 8-bit counter, 42 denotes a flip-flop circuit for holding 8-bit parallel outputs of the 8-bit counter, 43 denotes a coincidence detecting circuit, 44 denotes a test cell detecting circuit, 45 denotes an RS flip-flop circuit for generating a flag 1 indicating the detection of a test cell, 46 denotes a D flip-flop circuit for generating a flag 2 indicating the presence or absence of a hardware fault, and 47 and 48 denote AND circuits.

The operation of the test cell detecting section will be described with reference to FIG. 7A.

Line clock signals are applied to the shift register (SRG) 40, the 8-bit counter 41 and the flip-flop circuit 46. An ATM cell is entered as line data into the 8-bit counter and the test cell detecting circuit 44.

The test cell detecting circuit 44, which is equipped with a function of holding 5 bytes of line data (8-bit parallel) and detecting whether or not the contents has a test cell identifier, performs no detecting operation unless the shift register 40 produces an output.

A cell frame signal (refer to A in FIG. 7) generated in synchronism with the beginning of each cell (beginning of the header) output from the ATM switch is placed into the shift register 40 by a line clock signal generated at this point. The signal is output from the shift register 40 after a delay of a period of 5 clock signals. The period of 5 clock signals corresponds to the period of the header in each ATM cell. The test cell detecting circuit 44 holds the contents of 5 bytes input during that period and, upon receipt of the output of the shift register 40, performs an operation of detecting whether the header is a test cell having the predetermined identifier (specific VCI value).

Figure 7A:
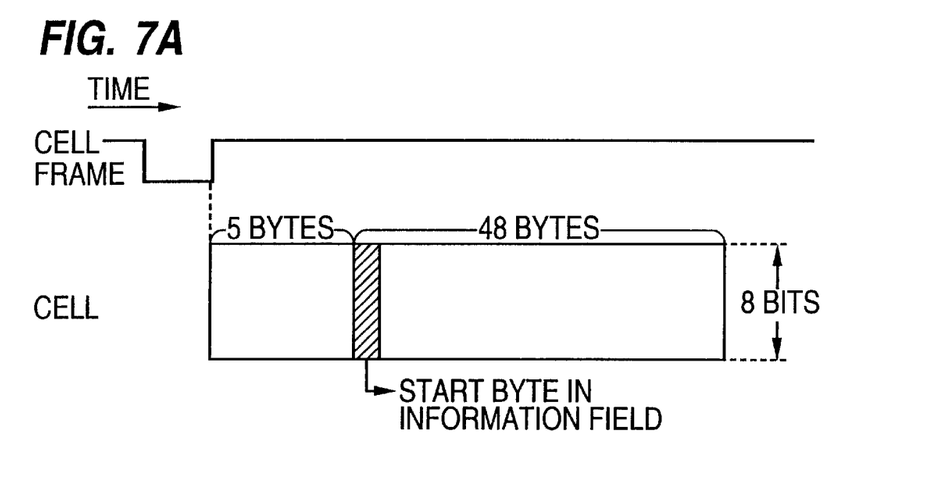
FIG. 7 is a diagram for use in explanation of the operation of the test cell decision section.

As shown in FIG. 7A for explaining the operation of the test cell detecting section, the test cell detecting circuit 44 makes a decision for the 5-byte header input to follow the cell frame. If a test cell is detected, the flip-flop circuit 45 is reset.

On the other hand, the 8-bit counter 41 receives at its load terminal the output of the shift register 40 after a period of 5 clock signals from the cell frame and sets an 8-bit parallel signal supplied from line data at the next sixth clock signal as its preset input.

The 8-bit parallel signal input as the sixth byte in a cell is a count value (the starting value set in the information field of the test cell generated from the 8-bit counter of FIG. 4) set in the start byte of the information field in the test cell as shown in FIG. 7A. When this value is preset as an initial value, the 8-bit counter 41 subsequently counts the line clock signals and applies a count at each clock signal to the coincidence detecting circuit 43.

Each byte (8-bit parallel) signal input from the line data after the start byte of the information field in the test cell is set into the flip-flop circuit 42 with each clock signal. Its output is compared with the output of the 8-bit counter 41 in the coincidence detecting circuit 43. The coincidence detecting circuit 43 produces an output at a high level when a coincidence occurs and an output at a low level when no coincidence occurs. This operation is repeated with each clock signal until the last byte (the 48th byte) in the information field of the test cell shown in FIG. 7A is reached. The output of the coincidence detecting circuit 43 is set into the D flip-flop 46. When coincidence is detected for all the bytes, the flip-flop circuit 46 continuously produces at its output Q an output at a high level.

Thus, when the flip-flop circuit 45 produces an output flag 1 at a high level as a result of a success in detecting a test cell, and coincidentally the flip-flop circuit 46 produces an output of flag 2 at a high level as coincidence is detected for all the bytes of the information field data when the information field data in the test cell obtained from the line data is compared with count values in the 8-bit counter 41, the AND circuit 47 continuously produces an output TSTOK at a high level and the AND circuit 48 produces an output TSTNG at a low level. This represents that the test cell has been switched properly and there is no hardware fault in the switch.

On the other hand, when non-coincidence occurs in the coincidence detecting circuit 43, "L" is set in the flip-flop circuit 46 during a period when the non-coincidence is produced, producing "L" at output Q and "H" at inverted output (−Q). When the detection of the test cell is successful, the flip-flop 45 provides the output signal at "H". The AND circuit 47 provides one input signal at "L" and the other input signal "H", and the AND circuit 48 has BOS input signals at "H". Thus, the AND circuit 47 produces a TSTOK signal at "L" representing that the test cell is normally detected and the AND circuit 48 produces a TSTNG signal at "H" representing that the data and the information field is abnormal. Note that the flip-flop circuit 46 changes its state when the coincidence detecting circuit 43 returns from the non-coincidence detecting state to the coincidence detecting state.

Figure 7B:
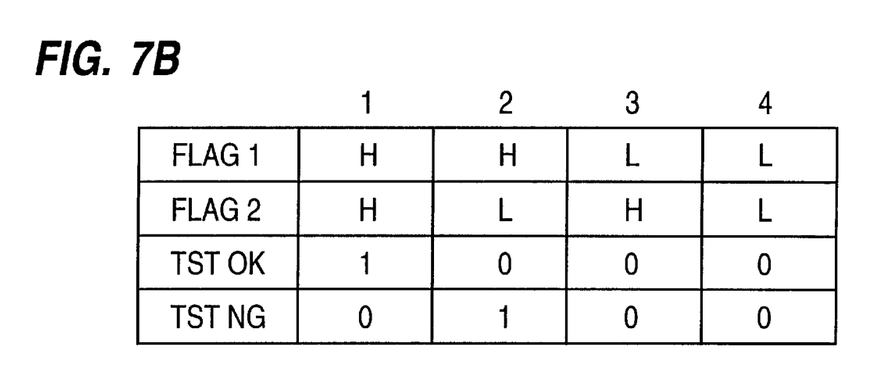

FIG. 7B shows relationships among the flag 1, the flag 2 and the results of decision TSTOK and TSTNG. By examining two bits of TSTOK and TSTNG the test result can be diagnosed. That is, when TSTOK and TSTNG are both low ("L"("0")) (corresponding to (3) and (4) in FIG. 7B), is it decided that the test cell has not been transferred, that is, it is decided that there is a path fault in the switch. When the TSTOK is "L" ("0"), while the TSTNG is "H" ("1") (corresponding to (2) in FIG. 7B), which represents that a test cell has been received but its data (information field) is not correct, it is decided that there is a hardware fault in the switch. Only when the TSTOK is "H"("1"), while the TSTNG is "L"("0") (corresponding to (1) in FIG. 7B), it is decided that the test succeeded (the switch is good).

Although, in the above description, counter values are used as regular data, a pseudo-random pattern or any other pattern or code, such as a CRC code, may be used instead.

According to the present invention, a test can be made to determine if paths in an ATM switch are set properly to transfer data without the occurrence of any error, and the quality of the ATM switch can be maintained. In addition, a test of the ATM switch can be implemented with a small amount of hardware.

What is claimed is:

1. A path test system for an ATM switch, comprising:
test cell identifier generating means for generating a test cell identifier and routing information identifying a path of said ATM switch as a header of a test cell;
first regularity data generating means for inserting data having a regularity of a count value according to a clock into an information field of said test cell;
test cell identifier detecting means for detecting the test cell identifier of said header of said test cell which has passed the path of the ATM switch; and
regularity detecting means for detecting the regularity of the data in the information field of said test cell which has passed the path of the ATM switch,
wherein said regularity detecting means comprises:

second regularity data generating means for sequentially generating data having the same regularity; and
coincidence determining means for determining whether data generated by said second regularity data generating means coincides with data in the information field of said test cell which has passed the path of the ATM switch,
said first regularity data generating means includes a first counter for performing a counting operation in synchronization with the clock and for sequentially sending the result of the count as the data with the regularity in the information field of the test cell;
said second regularity data generating means includes a second counter for presetting the leading data written in the information field of a received test cell as an initial value and then for performing a counting operation in synchronization with the clock; and
said coincidence determining means determines whether each data item written in an information field coincides with the counted values sequentially outputted from said second counter.

2. A path test system for an ATM switch according to claim 1, wherein said regularity has a plurality of values which vary over time in synchronization with the clock.

3. A path test system for an ATM switch according to claim 1,
wherein said test cell identifier detecting means includes first retaining means for retaining the test cell identifier, and
wherein said regularity detecting means includes second retaining means for retaining comparison results from detecting the regularity.

4. A path test system for an ATM switch according to claim 1, wherein said second regularity data generating means generates data having the same regularity based on data transmitted from said test cell identifier generating means.

5. A path test system for an ATM switch according to claim 1, further comprising a selector for selecting an output from said test cell identifier generating means and sending the output thus selected as a header of the test cell and for selecting an output from said first counter and sending the output thus selected as data having said regularity.

6. A path test system for an ATM switch according to claim 1, further comprising:
a timing signal transmitting unit for generating a signal synchronized with a head of an information field of a test cell; and
a selector for sending either an output of said test cell identifier generating means or an output of said first counter after being selected, and for sending a counted value as data having said regularity to be written into the information field of a test cell.

7. A path test system for an ATM switch according to claim 1, wherein said coincidence determining means includes:
timing signal generating means for generating a timing signal delayed by a predetermined number of clock signals from a cell frame signal synchronized with the header of said test cell, said timing signal being synchronized with the head of the information field of said test cell; and
a third counter for presetting head data in the information field of said test cell outputted from said timing signal generating means and for performing a counting operation in synchronization with the clock.

8. A path test system for an ATM switch according to claim 1, further comprising determining means for determining a normality of the path of the ATM switch based on the detection results obtained by said test cell identifier detecting means and comparison results obtained by said regularity detecting means from detecting the regularity.

9. A path test system for an ATM switch according to claim 8, wherein said test cell identifier detecting means includes first retaining means for retaining the test cell identifier, wherein said regularity detecting means includes second retaining means for retaining the comparison results from detecting the regularity, and wherein said determining means determines the normality of the ATM switch based on the data retained in said first and second retaining means.

10. A path test method for an ATM switch, comprising the steps of:

generating a test cell identifier and a routing information identifying a path of said ATM switch as a header of a test cell;

inserting data having a regularity of a count value according to a clock into an information field of said test cell;

detecting the test cell identifier of said header of said test cell which has passed the path of the ATM switch; and detecting the regularity of the data in the information field of said test cell which has passed the path of the ATM switch, by performing a counting operation in synchronization with a clock and sequentially sending the result of the count as the data with the regularity in the information field of the test cell, presetting the leading data written in the information field of a received test cell as an initial value and then performing a second counting operation in synchronization with the clock, determining whether each data item written in an information field coincides with the counted values.

* * * * *